United States Patent
Richards et al.

(10) Patent No.: US 9,892,415 B2
(45) Date of Patent: Feb. 13, 2018

(54) AUTOMATIC MERCHANT-IDENTIFICATION SYSTEMS AND METHODS

(71) Applicant: MARKETLY LLC, Santa Clara, CA (US)

(72) Inventors: Chase Richards, Seattle, WA (US); Eric Catlin, Seattle, WA (US); Anthony Bisig, Graham, WA (US); Pulin Thakkar, Saratoga, CA (US)

(73) Assignee: MARKETLY LLC, Santa Clara, CA (US)

( * ) Notice: Subject to any disclaimer, the term of this patent is extended or adjusted under 35 U.S.C. 154(b) by 417 days.

(21) Appl. No.: 14/677,816

(22) Filed: Apr. 2, 2015

(65) Prior Publication Data

US 2015/0287046 A1 Oct. 8, 2015

Related U.S. Application Data

(60) Provisional application No. 61/974,838, filed on Apr. 3, 2014.

(51) Int. Cl.
*G06Q 30/00* (2012.01)
*G06Q 99/00* (2006.01)

(52) U.S. Cl.
CPC ......... *G06Q 30/0185* (2013.01); *G06Q 99/00* (2013.01)

(58) Field of Classification Search
None
See application file for complete search history.

(56) References Cited

U.S. PATENT DOCUMENTS

| | | | |
|---|---|---|---|
| 8,943,588 B1 * | 1/2015 | Speegle | H04L 63/1483 726/22 |
| 9,349,134 B1 * | 5/2016 | Adams | G06F 21/53 |
| 2004/0158503 A1 * | 8/2004 | Gross | G06Q 30/0601 705/26.1 |

(Continued)

OTHER PUBLICATIONS

Dougherty, C., "Sales of Knockoff 'Brand Name' Golf Clubs Online Is Booming on eBay," Knight Ridder Tribune Buniess News [Washington] Jul. 4, 2003.*

*Primary Examiner* — Nicholas D Rosen
(74) *Attorney, Agent, or Firm* — Aeon Law PLLC; Adam L. K. Philipp (57) ABSTRACT

Merchant accounts associated with sales of counterfeit or other prohibited goods may be automatically discovered by identifying websites that have traits characteristic of those that sell prohibited goods. Automated browsing sessions are established with the respective websites, in which communication traffic, page identifiers, and page contents are captured for analysis. During each of the automated sessions, a website is automatically navigated to locate and visit a payment-processing page associated with a known payment processor. The captured data from the session is analyzed to identify a merchant account established with the payment processor for receiving proceeds from sales of prohibited goods. In some cases, the captured data is analyzed to identify a common merchant and/or page identifier that was encountered in multiple sessions. Multiple otherwise unrelated websites may thereby be grouped together as being likely associated with a common merchant account.

16 Claims, 7 Drawing Sheets

(56) References Cited

U.S. PATENT DOCUMENTS

| | | | |
|---|---|---|---|
| 2008/0008348 A1* | 1/2008 | Metois | G06K 9/46 |
| | | | 382/100 |
| 2008/0262960 A1* | 10/2008 | Malone | G06Q 30/0601 |
| | | | 705/37 |
| 2009/0327849 A1* | 12/2009 | Kavanagh | G06Q 10/107 |
| | | | 715/205 |
| 2011/0264582 A1* | 10/2011 | Kim | G06Q 20/102 |
| | | | 705/40 |
| 2016/0034884 A1* | 2/2016 | Howe | G06Q 20/382 |
| | | | 705/44 |
| 2016/0055490 A1* | 2/2016 | Keren | G06Q 30/00 |
| | | | 705/14.47 |
| 2016/0092875 A1* | 3/2016 | Howe | G06Q 20/405 |
| | | | 705/44 |
| 2017/0161753 A1* | 6/2017 | McKinnon | G06Q 30/0185 |

* cited by examiner

| Online Marketplace Domain | Online Marketplace Host Name | Shop Date | Merchant Id | Payment Service Provider Domain |
|---|---|---|---|---|
| microsoftoffice2013key.com | www.microsoftoffice2013key.com | 4/2/14 | [95gateway.com:5449] | 95gateway.com |
| bestofficebay.ca | bestofficebay.ca | 4/2/14 | [icpayment.com:sslepay8801] | icpayment.com |
| windows8keyAsale.com | www.windows8keyAsale.com | 4/2/14 | [wedpay.net:51280] | wedpay.net |
| godcart.org | godcart.org | 4/2/14 | [wedpay.net:51075] | wedpay.net |
| cheapwindowskey.net | cheapwindowskey.net | 4/2/14 | [95gateway.com:30043] | 95gateway.com |
| oemoffice.com | oemoffice.com | 4/2/14 | [sfepay.com:3743] | sfepay.com |
| softwarecodesgalaxy.com | www.softwarecodesgalaxy.com | 4/2/14 | [95gateway.com:30115] | 95gateway.com |
| getsoftwarekey.com | www.getsoftwarekey.com | 4/2/14 | [95gateway.com:31002] | 95gateway.com |
| darwesh.net | www.darwesh.net | 4/2/14 | [okpay.com:OK32634377] | okpay.com |
| buywindows8professionalkey.org | www.buywindows8professionalkey.org | 4/2/14 | [sfepay.com:3685] | sfepay.com |
| shopAps.com | www.shopAps.com | 4/2/14 | [dixipay.com:201000008667] | dixipay.com |
| welcomesoftware.com | www.welcomesoftware.com | 4/2/14 | [globefastpay.com:1224] | globefastpay.com |
| digitaldeliverydownloads.com | www.digitaldeliverydownloads.com | 4/2/14 | [googlecommerce.com:155724] | googlecommerce.com |
| softwarecw.com | softwarecw.com | 4/2/14 | [googlecommerce.com:8368] | googlecommerce.com |
| newoemsoftware.com | newoemsoftware.com | 4/2/14 | [moneybookers.com:southern.generation@gmail.com] | moneybookers.com |
| keymall.co.uk | www.keymall.co.uk | 4/2/14 | [payworks.com.cn:keymall] | payworks.com.cn |
| thesoftstocks.com | www.thesoftstocks.com | 4/2/14 | [payworks.com.cn:sslepay8801] | payworks.com.cn |

AUTOMATIC MERCHANT-IDENTIFICATION SYSTEMS AND METHODS

CROSS-REFERENCE TO RELATED APPLICATIONS

This application claims the benefit of priority to Provisional Patent Application No. 61/974,838; filed Apr. 3, 2014; titled AUTOMATED MERCHANT-IDENTIFICATION SYSTEMS AND METHODS; and naming inventors Chase Richards et al. The above-cited application is hereby incorporated by reference, in its entirety, for all purposes.

FIELD

This disclosure is directed to the field of electronic commerce, and more particularly to automatically identifying merchants that operate e-commerce websites dealing in counterfeit or other prohibited goods.

BACKGROUND

A "brand name", or simply "brand", identifies the brand owner as the commercial source of particular products or services. In some cases, words, logos, sounds, colors, and/or other source-identifying brand components may be registered with a government agency as trademarks, although registration is not required for a source-identifier to function as a brand or brand name.

In many cases, consumers are willing to pay a price premium for goods identified by highly-regarded brands. Consequently, some unscrupulous merchants are tempted to produce and/or sell fake replicas and/or imitations of brand-name goods to capture for themselves some of the price premium associated with highly-regarded brands. Such fake product replicas are commonly referred to as "knockoffs" or "counterfeit goods".

Frequently counterfeited goods include brand-name clothing, handbags, shoes, pharmaceuticals, aviation and automobile parts, watches, electronics, software, works of art, toys, movies, and the like.

Counterfeiters typically attempt either to deceive a consumer into thinking that he or she is purchasing a legitimate product, or to convince the consumer that he or she could deceive others with a product that the consumer knows to be an imitation. A fake-replica item that makes no attempt to deceive, such as a copy of a DVD with missing cover art, is often called a "bootleg" or a "pirated copy".

The sale of a counterfeit version of a particular brand-name good can harm the legitimate brand-owner in various ways. For example, a consumer who wants to buy a legitimate brand-name product may be diverted to purchase the knockoff because the knockoff might be priced lower than the legitimate product, depriving the legitimate brand-owner from the proceeds of that sale. Relatedly, knockoff products are often of lower quality than the legitimate versions of a brand-name product, so consumers who purchase a knockoff may develop lowered expectations about the quality of goods associated with the brand name, harming the brand-owner's goodwill in the brand.

To protect consumers and brand owners, the United States and most other developed countries prohibit the production, importation, and/or sale of counterfeit and other fake-replica goods under various trademark, false-advertising, and/or unfair-business-practice laws and/or doctrines. As a result, merchants that deal in counterfeit and other similarly prohibited goods typically do not make it easy for brand owners, enforcement authorities, or other interested parties to identify the merchants.

It is common for a given merchant that deals in counterfeit and other prohibited goods to set up multiple e-commerce websites or store front sites. However, it also common for a given merchant to establish only one or a small number of merchant accounts with one or a small number of payment service processors. In this context, the payment service processor is a company appointed by the merchant to handle credit card or other payment transactions for the sale of the merchant's (counterfeit) goods. It is common for a given merchant to use the same merchant account(s) with each of the store fronts that the merchant sets up.

It is often useful for a brand-owner or other interested party to identify the merchant accounts that are being used to process payments for sales of counterfeit or other prohibited goods. However, neither merchants nor payment service processors publicize such merchant-account identifiers.

In some, but not all, cases, it is possible to discover a merchant-account identifier by manually transacting with and inspecting a given store front. However, such manual inspection provides inconsistent results, is highly time-consuming, and does not scale well when there are hundreds or thousands of store fronts to inspect.

BRIEF DESCRIPTION OF THE DRAWINGS

FIG. 6 illustrates an example report associating merchant identifiers with e-commerce websites, such as may be provided to a brand owner or other interested party in accordance with one embodiment.

DESCRIPTION

In various embodiments, as discussed herein, an automatic merchant-identification service may automatically identify merchant accounts using automated browsing sessions to navigate and render pages on e-commerce websites while a local proxy captures communications (HTTP/HTTPS) traffic sent or received by the automated browsing sessions.

Generally, an automated browsing session comprises a browser (e.g., Chrome, Firefox, Internet Explorer, and the like) configured to be controlled via a software browser controller component (e.g., Web Driver, Chrome Driver, Capybara, and the like). Generally, various page-parsing systems (as described further below) identify potentially useful elements on a page, and various state and logic systems interpret the page, determine the current state with regard to a shopping process, and make decisions about what page elements to interact with.

In some embodiments, the automated browsing sessions may be configured to restrict content to a minimum page size, block images, and prevent unnecessary elements from generating web requests. The automated browsing sessions are further configured to track virtual "clicks", browser navigations, and page manipulations in order to record interaction sequences by page content and URL location. During an automated browsing session, form-filling logic may identify fillable form elements on a page and determine fillable data as appropriate. In some embodiments, a remote-server routing client routes communication traffic through disparate IP locations to facilitate session sandboxing.

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

As discussed herein, in various embodiments, a processor and/or processing device may be configured (e.g., via non-transitory computer-readable storage media) to perform a first method for identifying a merchant account associated with sales of prohibited goods, the first method including steps similar to some or all of the following: identifying a website that has one or more traits that are characteristic of an e-commerce website that sells the prohibited goods; establishing an automated browsing session between the processor and the website in which communication traffic, page identifiers, and page contents are captured for analysis; automatically navigating through the website via the automated browsing session to locate and visit a payment-processing page; determining which payment service processor of two or more known payment service processors is associated with the payment-processing page; analyzing at least some of the captured communication traffic, page identifiers, and page contents to determine a merchant identifier identifying a particular merchant account established with the determined payment service processor for receiving proceeds from the sales of the prohibited goods; and storing a record associating the particular merchant account with the website.

In some embodiments performing the first method, automatically navigating through the website to locate and visit the payment-processing page comprises: automatically identifying an item that is available to purchase via the website; automatically initiating a purchase-sequence of browsing operations that, if completed, would result in a purchase of the identified item; and automatically progressing through the purchase-sequence of browsing operations until encountering the payment-processing page.

In some embodiments performing the first method, automatically identifying the item that is available to purchase via the website comprises: obtaining an object model corresponding to two or more renderable elements on a given page of the website; identifying a renderable-element whose contents match a price-tag-indicative pattern; determining whether the renderable-element is a child of a parent container object having a shared structure that is shared by multiple other container objects within the object model; and when the parent container object is determined to have the shared structure, determining that the parent container object corresponds to the item that is available to purchase.

In some embodiments performing the first method, automatically progressing through the purchase-sequence of browsing operations comprises: determining that content associated with a given page matches a pattern indicating a product-detail page; obtaining an object model corresponding to two or more renderable elements on the given page of the website; identifying a price renderable-element whose contents match a price-tag-indicative pattern; identifying a quantity renderable-element whose contents match a quantity-indicative pattern; locating an add-to-cart button or an anchor element that is near to the price renderable-element and the quantity renderable-element within the object model; and activating the add-to-cart button or the anchor element.

In some embodiments performing the first method, automatically progressing through the purchase-sequence of browsing operations comprises: determining that content associated with a given page matches a pattern indicating a billing and/or shipping details page; identifying every field and/or control on the given page that will accept input related to the billing and/or shipping details; and providing to the given page input values for the every field and/or control, the input values being randomly selected from a pool of pre-determined input options for a given type of field or control.

In some embodiments performing the first method, the prohibited goods comprise counterfeit goods.

In some embodiments performing the first method, the first method further includes identifying the particular merchant account to an owner of a trademark associated with the prohibited goods.

In various embodiments, a processor and/or processing device may be configured (e.g., via non-transitory computer-readable storage media) to perform a second method for identifying a cluster of related websites that sell prohibited goods, the second method including steps similar to some or all of the following: identifying two or more websites that have one or more traits that are characteristic of an e-commerce website that sells prohibited goods; establishing two or more automated browsing sessions between the processor and a respective two or more websites in which communication traffic, page identifiers, and page contents from each automated browsing session are captured for analysis; during each of the two or more automated browsing sessions, automatically navigating through one of the two or more websites to locate and visit a payment-processing page; analyzing the captured communication traffic, page identifiers, and page contents from each of the two or more automated browsing sessions to identify at least one common merchant identifier and/or page identifier that was encountered in two or more of the two or more automated browsing sessions; and identifying, based at least in part on the at least one common merchant identifier and/or page identifier, two or more related websites among the two or more websites that are likely associated with a common merchant that deals in the prohibited goods.

In some embodiments performing the second method, identifying the two or more related websites comprises, for each automated browsing session of the two or more automated browsing sessions: determining which payment service processor of two or more known payment service processors is associated with the payment-processing page; and analyzing at least some of the captured communication traffic, page identifiers, and page contents to determine a merchant identifier identifying a particular merchant account established with the determined payment service processor for receiving proceeds from sales of the prohibited goods.

In some embodiments performing the second method, identifying the two or more related websites comprises, for each automated browsing session of the two or more automated browsing sessions: determining a resource identifier identifying an intermediate resource to which a given automated browsing session is directed or redirected before visiting the payment-processing page.

In some embodiments performing the second method, the prohibited goods comprise counterfeit goods.

In some embodiments performing the second method, the second method further includes identifying the two or more related websites to an owner of a trademark associated with the prohibited goods.

Described more fully below are many additional details, variations, and embodiments that may or may not include some or all of the steps, features, and/or functionality described above.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 1:
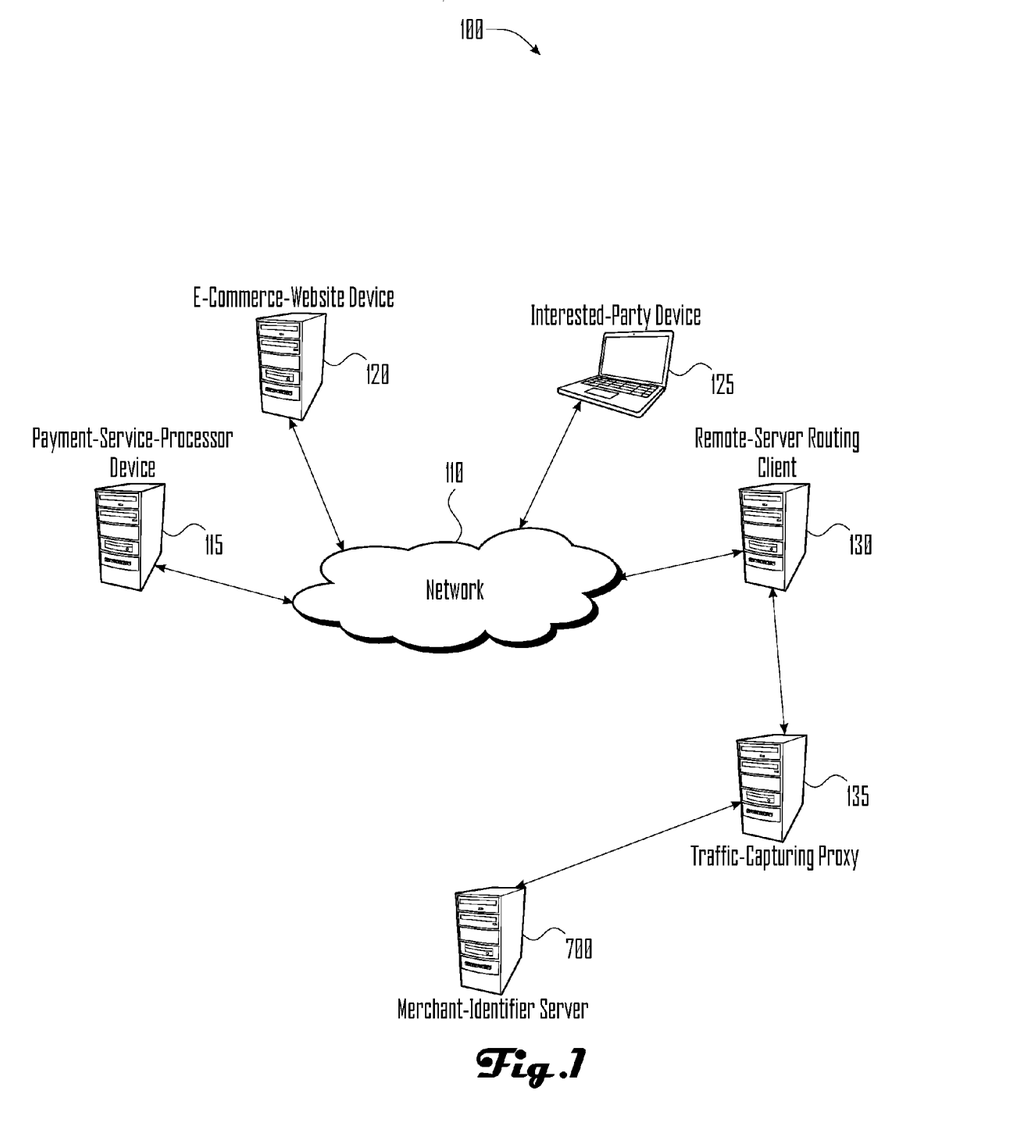
FIG. 1 illustrates a simplified automatic merchant-identification system in which merchant-identifier server, payment-service-processor device, e-commerce-website device, interested-party device, remote-server routing client, and traffic-capturing proxy are connected to network.

FIG. 1 illustrates a simplified automatic merchant-identification system in which merchant-identifier server 700, payment-service-processor device 115, e-commerce-website device 120, interested-party device 125, remote-server routing client 130, and traffic-capturing proxy 135 are connected to network 110.

Merchant-identifier server 700 (see FIG. 7, discussed below) represents a provider of automatic-merchant-identification services, such as described more fully below.

In various embodiments, network 110 may include the Internet, a local area network ("LAN"), a wide area network ("WAN"), and/or other data network. In addition to traditional data-networking protocols, in some embodiments, data may be communicated according to protocols and/or standards including near field communication ("NFC"), Bluetooth, power-line communication ("PLC"), and the like.

Payment-service-processor device 115 represents one or more computing devices, operated by a payment service processor, that is capable of connecting to network 110 and providing payment-processing services, such as described herein. Typically, several such payment service processors may exist, each with its own devices.

E-commerce-website device 120 represents one or more computing devices, operated by a merchant, that is capable of connecting to network 110 and providing marketplace, store-front, or other e-commerce-website services, such as described herein. Typically, many such e-commerce websites may be accessible via network 110.

Interested-party device 125 represents one or more computing devices, operated by a brand owner, enforcement authority, or other interested-party, that is capable of connecting to network 110 and communicating with merchant-identifier server 700, such as described herein.

In various embodiments, remote-server routing client 130 may include desktop PCs, mobile phones, laptops, tablets, wearable computers, or other computing devices that are capable of connecting to network 110 and routing communication traffic through disparate IP addresses to facilitate session sandboxing, such as described herein. In some embodiments, such functionality may instead or in additional be provided by a software process running on merchant-identifier server 700.

In various embodiments, traffic-capturing proxy 135 may include desktop PCs, mobile phones, laptops, tablets, wearable computers, or other computing devices that are capable of connecting to network 110 and capturing communication traffic, page identifiers, and page contents communicated between merchant-identifier server 700 and, such as described herein. In some embodiments, such functionality may instead or in additional be provided by a software process running on merchant-identifier server 700.

In various embodiments, additional infrastructure (e.g., short message service centers, cell sites, routers, gateways, firewalls, and the like), as well as additional devices may be present. Further, in some embodiments, the functions described as being provided by some or all of merchant-identifier server 700, payment-service-processor device 115, e-commerce-website device 120, remote-server routing client 130, and traffic-capturing proxy 135 may be implemented via various combinations of physical and/or logical devices.

However, it is not necessary to show such infrastructure and implementation details in FIG. 1 in order to describe an illustrative embodiment.

Figure 2:
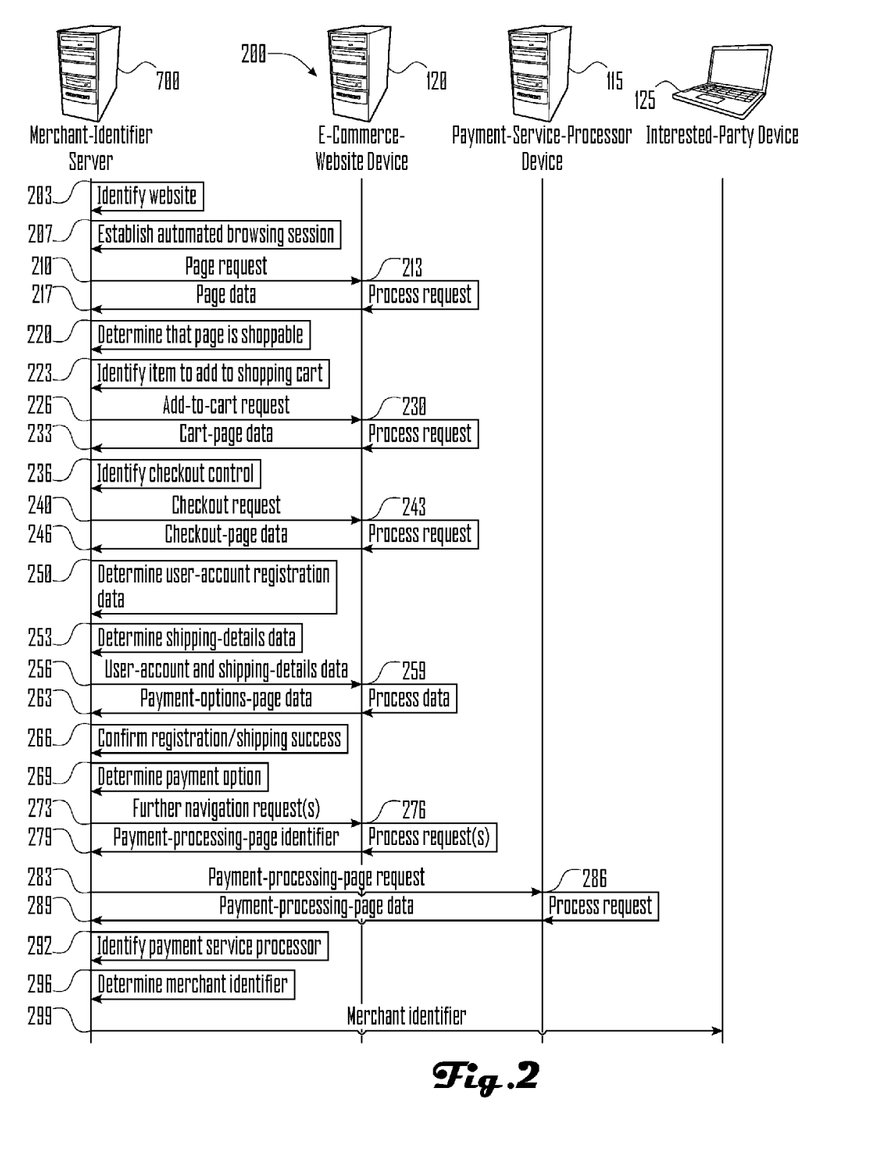
FIG. 2 illustrates an exemplary series of communications between merchant-identifier server, e-commerce-website device, payment-service-processor device, and interested-party device in accordance with one embodiment.

FIG. 2 illustrates an exemplary series of communications between merchant-identifier server 700, e-commerce-website device 120, payment-service-processor device 115, and interested-party device 125 in accordance with one embodiment. The communications shown in FIG. 2 do not encompass every combination of possibilities in which the systems and methods provided herein may be employed. Rather, the illustrated communications merely provide an overview of one simplified example scenario. Additional variations and alternatives are described more fully in the Figures and description that follow.

In the illustrated example, remote-server routing client 130 and/or traffic-capturing proxy 135 (not shown) may mediate and/or capture communications traffic to and from merchant-identifier server 700.

Beginning the illustrated sequence of communications, merchant-identifier server 700 identifies 203 a website that has one or more traits that are characteristic of an e-commerce website that sells prohibited goods and establishes 207 an automated browsing session that will handle communications with e-commerce-website device 120 and payment-service-processor device 115, as discussed below. In various embodiments, a brand owner or other interested party may provide a list of URLs to inspect, including one identifying the identified website. In other embodiments, the website may be identified via querying a search engine for terms related to a brand and/or goods that are suspected of being sold by counterfeiters.

Merchant-identifier server 700 sends to e-commerce-website device 120 a request 210 requesting data for a starting page of the identified website. E-commerce-website device 120 processes 213 the request and sends to merchant-identifier server 700 the page data 217.

Merchant-identifier server 700 determines 220 that the page is "shoppable": whether the page is part of an e-commerce website that offers goods for sale. In various embodiments, determining that a page is 'shoppable' may include as an initial screening determining that the page data is at least a certain size and of a certain content type.

If the page data passes the initial screening, merchant-identifier server 700 may further obtain textual renderable data from the page and evaluate the textual contents to determine whether they match pre-determined characteristics of previously examined marketplace sites.

For example, in one embodiment, merchant-identifier server 700 may join inner-text HTML elements from the page source and into a collection of words and their respective frequencies. After applying a stop-word list, the word-frequencies may be measured against the known relative frequencies of words from previously categorized marketplaces to determine whether the current page is likely 'shoppable'.

Merchant-identifier server 700 identifies 223 an item to add to a shopping cart. For example, in one embodiment, merchant-identifier server 700 parses and analyzes the HTML page structure to identify common node types, content, and attributes within the page. In one embodiment, merchant-identifier server 700 performs a breadth-first search that originates from one or more selected pivot node-types. Specifically, prices, quantities, and image placeholders may serve as pivot nodes when identifying product listings.

In one embodiment, the search propagates outward from the pivot node(s) searching for other associated node types. Upon finding such nodes, merchant-identifier server 700 determines the distance in hierarchical generations and generational siblings away from the original pivot node to its searched node-types.

Once merchant-identifier server 700 has computed a distance-map for each pivot node, merchant-identifier server 700 orders the pivot nodes by their corresponding distance-maps and selects those with the shortest combined distances shared by the most nodes. The selected nodes thereby represent clusters of related elements containing targeted components that have some degree of repetition throughout the page. Each cluster of related elements typically includes an image, a price indicator, and a link to potentially purchasable item.

In some embodiments, basing such page-analysis and cluster-identification techniques on HTML structure may allow identification of clustered elements and product listings independent of the page language (e.g., English, German, Japanese, and the like) and terminology.

Having identified an item, merchant-identifier server 700 sends to e-commerce-website device 120 a request 226. For example, in one embodiment, merchant-identifier server 700 selects an element from the collection of clusters and simulates a click or other activation of the element via the automated browsing session, attempting to visits a detail page of the item or to add the item to a shopping cart. In the illustrated example, merchant-identifier server 700 adds the item to a shopping cart.

E-commerce-website device 120 processes 230 the add-to-cart request and sends to merchant-identifier server 700 cart-page data 233 corresponding to a shopping-cart page.

In the illustrated embodiment, once merchant-identifier server 700 determines it has successfully added an item to a shopping cart, merchant-identifier server 700 performs a search to identify 236 a 'checkout' button, link, or other control. In various embodiments, merchant-identifier server 700 may determine that the item was successfully added to a shopping cart by monitoring contextual queues such as changing numerical values on the page or successful spot messages.

To locate a checkout control, merchant-identifier server 700 uses a similar breadth-first search as described above in connection with finding product listings. However, when locating a checkout control, merchant-identifier server 700 utilizes different pivot nodes and node-type combinations. In some embodiments, node-types appearing frequently within reasonable proximity to a checkout control may include nodes that describe items in a shopping container, modification nodes for quantity or subtotals, and buttons that offer to return to the original store.

Merchant-identifier server 700 sends to e-commerce-website device 120 a request 240 to checkout. E-commerce-website device 120 processes 243 the checkout request and sends to merchant-identifier server 700 checkout-page data 246.

Merchant-identifier server 700 determines 249 the user-account registration data.

In the illustrated embodiment, merchant-identifier server 700 determines to register a user account automatically by determining based on page-content analysis that the checkout-page provides a form for creating an account before completing the checkout sequence. Merchant-identifier server 700 locates form containers and elements on the page and iterates over them while matching node type, name, and other affiliated context and attributes to predetermined account details.

Once merchant-identifier server 700 has matched form elements with predetermined account details, it updates the page with the matched content respecting order and accounting for additional dynamic or background changes. If any unmatched form elements remain, merchant-identifier server 700 populates the unmatched fields with random content. In some embodiments, merchant-identifier server 700 confirms the registration process was successful by checking page content for affirming messages or significant page content changes.

Merchant-identifier server 700 also determines 253 the shipping-details data.

In the illustrated embodiment, merchant-identifier server 700 also automatically completes a shipping details form in a manner similar to that described above for completing a user-account registration form.

For example, merchant-identifier server 700 may identify forms and fields that the site requires before completing the checkout sequence. Merchant-identifier server 700 matches form fields (e.g., name, street address, country, shipping-method preference, and basic contact information) with predetermined or currently-generated account details.

Merchant-identifier server 700 sends to e-commerce-website device 120 a user-account and shipping-details data 256, such as by activating one or more controls or otherwise submitting the forms data described above.

E-commerce-website device 120 processes 259 the data and sends to merchant-identifier server 700 payment-options-page data 263.

Merchant-identifier server 700 confirms 266 that it successfully submitted user-account and shipping-details data as described above, and further analyzes the page content to determine 269 a payment option offered by the website by identifying form fields, buttons, and/or other controls that offer one or more payment options.

Merchant-identifier server 700 sends to e-commerce-website device 120 one or more further navigation requests 273 to automatically navigate through the website until a payment-processing page is encountered.

E-commerce-website device 120 processes 276 the one or more requests and, at some point, sends to merchant-identifier server 700 a payment-processing-page identifier 279 (in addition to other data). In response, merchant-identifier server 700 sends a request 282 for the payment-processing page to payment-service-processor device 115, which processes 286 the request and sends to merchant-identifier server 700 payment-processing-page data 289.

Merchant-identifier server 700 receives the data, determines that it represents a payment-processing page (e.g., because the page requires credentialed or certified payment details such as a credit card number or payment account), and identifies 292 one of several known payment service processors based on the page contents, the page URL or identifier, or the like.

Having identified which payment service processor is associated with the payment-processing page, merchant-identifier server 700 checks the captured communication traffic, URL trail, and stored pages for details regarding communication between the automated browsing session and the payment service processor. From such data, merchant-identifier server 700 extracts determines 296 a merchant identifier identifying a particular merchant account established with the payment service processor for receiving proceeds from sales originating at the website.

For example, in one embodiment, if the payment service processor is determined to be 'PayPal', a merchant identifier may be determined from page contents of the payment-processing page, e.g., by locating a page element having structure and content similar to the following.

<div id="header" class="confidential">my account id</div>

In another embodiment, if the payment service processor is determined to operate from the domain 'Wedopay.net', a merchant identifier may be determined from POST data sent during the automated browsing session, e.g., by locating a 'MerNo' parameter in the URL.

https://www.wedopay.net/p/form?MerNo=123456

In yet another embodiment, if the payment service processor is determined to operate from the domain 'secure-paymentsprocess.com', a merchant identifier may be determined from parameters of the URL identifying the payment-processing page, e.g., by locating a 'business' parameter in the POST data.

session_id=sdkfjwie8908sdfnln&business=my_site&description_payment=VISA

Finally, in the simplified scenario illustrated, merchant-identifier server 700 sends to interested-party device 125 the merchant identifier 299, notifying the brand owner of a merchant account that receives proceeds from sales of goods from the website.

Figure 3:
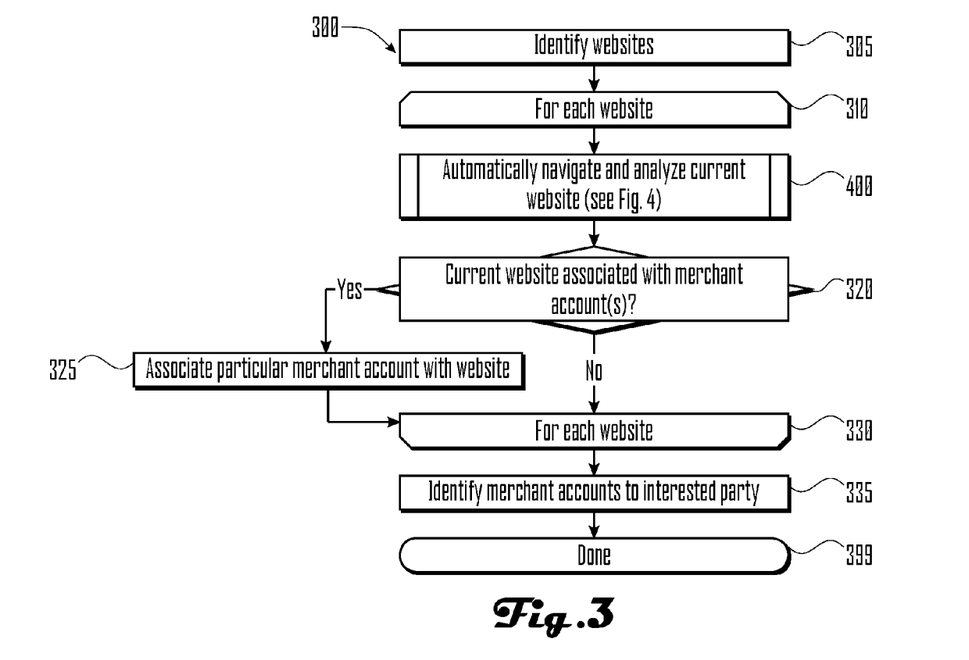
FIG. 3 illustrates an automatic merchant-identification routine for identifying merchants that operate e-commerce websites dealing in counterfeit or other prohibited goods, such as may be performed by a merchant-identifier server in accordance with one embodiment.

FIG. 3 illustrates an automatic merchant-identification routine 300 for identifying merchants that operate e-commerce websites dealing in counterfeit or other prohibited goods, such as may be performed by a merchant-identifier server 700 in accordance with one embodiment.

In block 305, automatic merchant-identification routine 300 identifies one or more websites that have one or more traits that are characteristic of an e-commerce website that sells counterfeit or otherwise prohibited goods and/or services. In some embodiments, an interested party (e.g., a brand owner, an enforcement authority, or the like) may provide a list of websites to inspect.

In other embodiments, automatic merchant-identification routine 300 may determine one or more search terms related to a brand name and/or a class of goods and/or services and submit such search terms to a search engine to locate websites for possible further processing. In some embodiments, various templates may be used to generate search terms based on brands and products of interest to.

For example, in one embodiment, automatic merchant-identification routine 300 may use templates similar to some or all of the following to generate search terms related to a brand name and/or a class of goods and/or services.

Buy [BRAND] [PRODUCT] online
Buy [BRAND] [PRODUCT] outlet
Buy [BRAND] [PRODUCT] discount
Buy cheap [BRAND] [PRODUCT]
Buy [BRAND] [PRODUCT] new
Buy [BRAND] [PRODUCT] OEM In some embodiments, automatic merchant-identification routine 300 may use such template-generated search terms to locate websites related to shopping, discounts, sales, and the like.

In some embodiments, automatic merchant-identification routine 300 may analyze some or all of the located websites to identify one or more that have said one or more traits that are characteristic of an e-commerce website that sells prohibited goods. In various embodiments, such traits may traits similar to some or all of the following:

the website being hosted by or otherwise associated with an internet service provider ("ISP") and/or a domain name registrar that is known to host other e-commerce websites that are known or suspected of dealing in counterfeit or otherwise prohibited goods and/or services;

the presence of the website on a 'blacklist' of known or suspected e-commerce websites;

the website employing certain page structures, meta-tags, redirect techniques, and/or other similar page behaviors that have been previously observed in other e-commerce websites that are known or suspected of dealing in counterfeit or otherwise prohibited goods and/or services;

the website having a low score provided by a third-party website-ranking service;

and the like.

More particularly, in some embodiments, to analyze a given website, This Routine may resolve a host IP address associated with the website and profile one or more pages of the website by extracting components of the page's visual architecture. In some embodiments, profiling a page may include operations similar to some or all of the following.

Collect CSS for the page
Parse menus
Parse on-page email and phone numbers
Compute keyword by concatenating simplified category menu items To classify a given website as a shoppable marketplace, automatic merchant-identification routine 300 may use techniques similar to those described in reference to decision block 515 (see FIG. 5, discussed below).

Beginning in opening loop block 310, automatic merchant-identification routine 300 processes each website in turn.

In subroutine block 400, automatic merchant-identification routine 300 calls subroutine 400 (see FIG. 4, discussed below) to automatically navigate and analyze the current website to attempt to identify one or more merchant identifiers identifying one or more merchant accounts established with one or more payment service processors for receiving proceeds from sales of or similar monetary transactions associated with counterfeit or otherwise prohibited goods and/or services.

Figure 4:
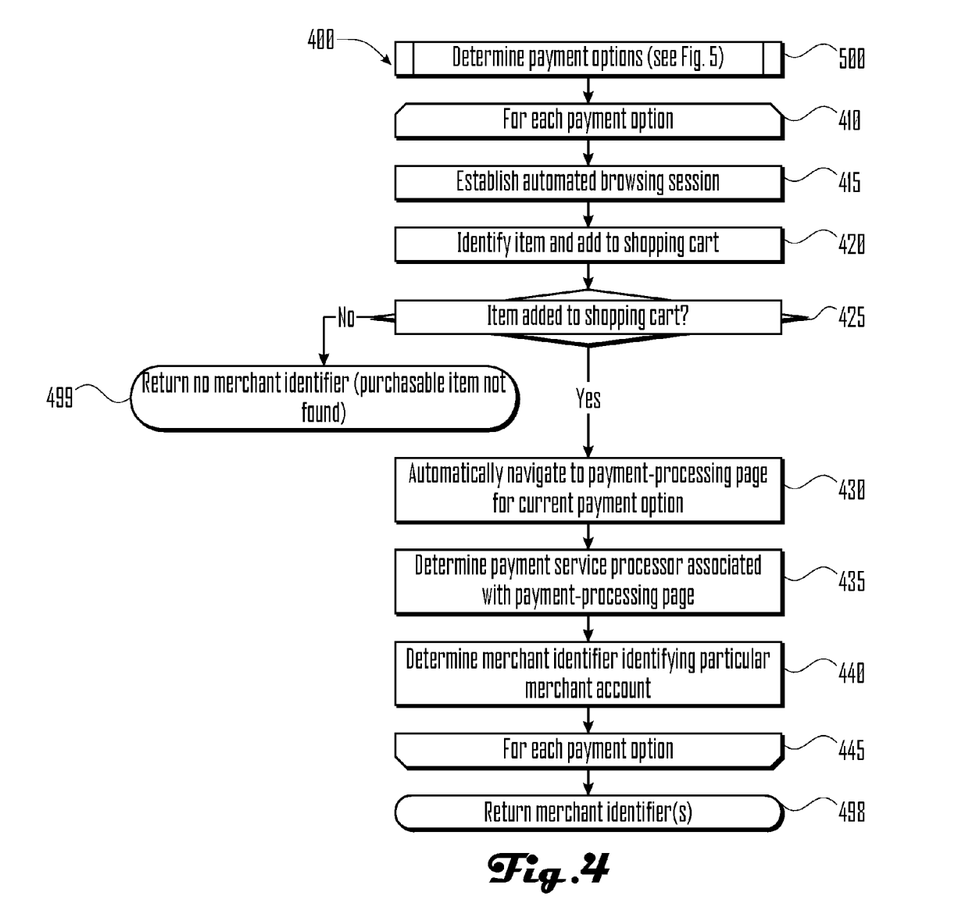
FIG. 4 illustrates an analyze-website routine for identifying a merchant that operates a given website dealing in counterfeit or other prohibited goods, such as may be performed by a merchant-identifier server in accordance with one embodiment.

In one embodiment, the automatic navigation process represents a single loaded page and the identified elements on that page as a "frame". Upon a interacting with the page, or a new page loading, a new "frame" is initialized and appended to a collection of previous "frames". Using such "frames", subroutine 400 can back up to a previous "frame" and "rewind" to pursue a different path through the website if it encounters a dead-end or a page with no use for the current context of the checkout process.

A common use of such a rewind system is the "sign-in or sign-up" process. For example, if subroutine 400 automatically navigated from a "Registration" page through a "Sign In" link to a dead-end (e.g., a page showing an 'Account does not exist' error), subroutine 400 may 'rewind' to the "Registration" page and following an alternate "Sign Up" link to continue progressing through a checkout process.

Generally, to automatically navigate the current website, subroutine 400 begins analyzing a given page by using various regular expressions or similar search patterns to determine whether the page's content and/or structure matches one of several known page types (e.g., a product-detail page, a shopping-cart page, an account-creation page, a shipping-details page, or the like).

For a given page type, subroutine 400 accesses a predetermined regular expression, search pattern, or other search criteria to locate a page element that is almost certain to be present on any page of the given type. From that or those page elements, subroutine 400 searches outward to locate one or more predetermined page elements that must be addressed before the checkout process can continue. For example, on an account-creation page, subroutine 400 will locate and fill out form-fields related to creating a user account; on a shipping-details page, subroutine 400 will locate and fill out form-fields related to entering shipping details; on a payment-options page, subroutine 400 will locate and select a payment option; and the like.

For example, in one embodiment when processing an account log-in page, subroutine 400 may identify two or more "Login" elements that match a regular expression similar to the following.

/sign|log( |_|-|.|)(in)|ouvrir un compte
Entrar|Accedi|Continue_as|Guest|btn_xpressCheckout|
button_login|continue_checkout|my account|myaccount/

By sorting input fields that reference the word "Login" by their distance to other related elements, subroutine 400 may prioritize a "Login" button that is near a text field labeled for "username", rather than by a similar input labeled for "re-enter password". Using such techniques, subroutine 400 tries to find the best-fit available, given that websites have a wide variety of page structures, and many websites have an inconsistent design, mislabeled buttons, and/or misspellings.

The "Login" button becomes the pivot in a breadth-first search expanding outward, and the distance to the first encounter of each of its supporting categories is returned, giving each pivot node a distinct distance-map of its position relative to supporting features. For example, supporting features of a "Login" button may include username elements, sign-in password elements, and/or forgotten password elements. Each such supporting feature may be identified with a corresponding pattern. For example, in one embodiment, a username element may match a pattern similar to the following.

/E-mail|Username|user name|login_email|Email Address|Returning Customer/

Generally, when processing a page having form fields, in one embodiment, automatic merchant-identification routine 300 may treat each fillable field (or drop-down menu, or radio-button group, or similar control) as required. If automatic merchant-identification routine 300 cannot determine that a given field or control is of a known type, in one embodiment, automatic merchant-identification routine 300 will submit random data for that field or control (e.g., automatic merchant-identification routine 300 will submit a random string for an unknown text field, or will select a random option from a selection menu, radio-button group, or the like).

In decision block 320, automatic merchant-identification routine 300 determines whether the current website was determined to be associated with one or more merchant accounts. If so, automatic merchant-identification routine 300 proceeds to block 325; otherwise, automatic merchant-identification routine 300 proceeds to ending loop block 330.

In block 325, automatic merchant-identification routine 300 stores (e.g., in merchant-identification database 740) a record associating a particular merchant account with the GivenWebsite.

In ending loop block 330, automatic merchant-identification routine 300 iterates back to opening loop block 310 to process the next website, if any. In block 335, automatic merchant-identification routine 300 identifies the merchant accounts to an interested party, such as an owner of a trademark associated with prohibited goods. For example, in one embodiment, automatic merchant-identification routine 300 may provide to an interested party data and/or a report similar to example report 600 (see FIG. 6, discussed below).

In some embodiments, identifying the merchant accounts to an interested party may include identifying one or more common merchant identifiers and/or page identifiers that are found in captured communication traffic, page identifiers, and page contents associated with two or more websites, suggesting that the two or more websites are likely associated with a common merchant that deals in the prohibited goods.

For example, in some embodiments, a given merchant may set up various e-commerce websites such that they each redirect a consumer's browser through a common page during the course of a shopping transaction. In some embodiments, redirecting consumers through such a page may server as a signal that an e-commerce website was established by or is otherwise associated with the given merchant, even though that common affiliation would not typically be observable by a consumer or by a manual observer of the shopping process.

Automatic merchant-identification routine 300 ends in ending block 399.

FIG. 4 illustrates an analyze-website routine 400 for identifying a merchant that operates a given website dealing in counterfeit or other prohibited goods, such as may be performed by a merchant-identifier server 700 in accordance with one embodiment.

In subroutine block 500, analyze-website routine 400 calls subroutine 500 (see FIG. 5, discussed below) to automatically navigate through the given website to determine one or more payment options by which a consumer can purchase goods and/or services via the given website. Generally, a payment option corresponds to a particular payment service processor.

Beginning in opening loop block 410, analyze-website routine 400 processes each payment option in turn.

In block 415, analyze-website routine 400 establishes an automated browsing session with the given website identified in block 305 in which communication traffic, page identifiers, and page contents are captured for analysis. In one embodiment, a software testing framework for web applications such as the Selenium testing framework (more particularly, the Selenium WebDriver component of the testing framework) may be employed to automatically control a browsing session in a supported browser. In other embodiments, other similar and/or related technologies may be employed to automate navigation through the given website.

In block 420, analyze-website routine 400 attempts to identify an item and add it to a shopping cart of the given website. Typically, identifying such an item begins by visiting a 'home' or landing page of the given website. Once data associated with the landing page has been obtained, analyze-website routine 400 obtains an object model including various renderable elements on the page in a hierarchical structure.

In one embodiment, analyze-website routine 400 first uses a regular expression or similar search pattern to locate one or more page elements having renderable text that represents a currency value, potentially indicating a price of an item that may be added to a shopping cart.

For each possible-price-tag element, in one embodiment, analyze-website routine 400 identifies a parent container of the object model that includes the possible-price-tag element, visible text, and zero or more links (e.g., HTML anchor tags), buttons, controls, or similar potentially actionable elements. In one embodiment, analyze-website routine 400 determines a set of criteria (e.g., an XPath expression) describing the structure of each parent container and counts occurrences of other container elements having the same (or similar) structure elsewhere in the document.

A parent container having a structure that is shared by several other counterpart containers on the page is deemed (along with its counterparts) to represent a potential product listing. In one embodiment, analyze-website routine 400 examines the renderable contents of a potential-product-listing container to locate a control that matches a pattern that is indicative of previously examined 'add-to-cart' controls. If a matching add-to-cart control is located, analyze-website routine 400 activates the control. Otherwise, analyze-website routine 400 attempts to locate and follow an HTML anchor tag or similar followable link within the contents of the container. If no followable link is located, then in one embodiment, analyze-website routine 400 causes a click and/or touch event within the rendered container on the page.

By iteratively processing pages in a similar manner, in many cases, analyze-website routine 400 eventually determines that an item has been added to a shopping cart.

In decision block 425, analyze-website routine 400 determines whether an item was successfully added to a shopping cart. If so, analyze-website routine 400 proceeds to block 430; otherwise, analyze-website routine 400 proceeds to ending block 499.

If analyze-website routine 400 was unable to identify an item and add it to a shopping cart, analyze-website routine 400 ends in ending block 499, returning no merchant identifiers.

In block 430, analyze-website routine 400 automatically navigates through the given website via automated browsing session established in block 415 to locate and visit a payment-processing page corresponding to the current payment option.

Generally, analyze-website routine 400 continues processing pages until it encounters a page that it is able to classify as a payment-processing page. In some embodiments, classifying a page as a payment-processing page depends on analyzing various features present on a page. In a manner similar to that described in respect to analyze-website routine 400 (see FIG. 4, discussed above), analyze-website routine 400 can also search for payment-related elements such as "Credit Card Entry Forms" or "Western Union payment information". When such elements are identified with enough confidence and supporting evidence, a "Success" is declared and the checkout is terminated, capturing account details about the vendor when possible (as discussed below).

In one embodiment, payment-related elements may be identified using a regular expression or similar search pattern similar to some or all of the following.

/(Card)Number|Numéro)de) carte|card|no|Kreditkartennummer|(Card)Expiry|Expiration)Date|Date)d'expiration|Verfall|sda)
(Date)of)birth|Birthday|Data)de)Nascimento|Fecha)de) nacim|
(Billing)Address|chargeback|Information)of) Bills|Informaç |
(cvv|CVC|CID|cay2|Card)Verification) Number|Security)Code|
(Order)No|OrderID|Order)Number) (Credit)Card|Kreditkarte|Card)Type|
(secure)order) processing)server|Your)data)is)protected)by|(Processing)
form|Payment)info|Payment)Gateway|Payment)Type|(Issuing)
Bank|Bank)Name|Banque)émettrice|Banco|Emissor|(Full)
name|First)Name|Last)Name|Kreditkarteninhaber|Nome))
(payflowpro_auth_cc_number/

In block 435, analyze-website routine 400 determines a payment service processor of several known payment service processors that is associated with the payment-processing page. In many cases, the payment service processor may be determined by matching a domain of the page URL against a set of known payment-service-processor/domain associations.

In block 440, analyze-website routine 400 analyzes at least some of the communication traffic, page identifiers, and page contents to determine a merchant identifier identifying a merchant account established with the payment service processor for receiving proceeds from sales of counterfeit or otherwise prohibited goods and/or services. Generally, different payment service processors require different analysis techniques.

For example, in one embodiment, if the payment service processor is determined to be 'PayPal', a merchant identifier may be determined from page contents of the payment-processing page, e.g., by locating a page element located at a node specified by an XML Path Language ("XPath") expression similar to some or all of the following.

//*[@id='header']/h1
//*[@id="header"]/div/div[1]/span/text( )
//*[@id="header"]/img Using one such XPath expression, analyze-website routine 400 may be able to extract a merchant identifier such as "MarketlyExampleAccount@marketly.com" from a portion of page contents similar to the following.

```
<div id="header">
<img src="https://static.e-junkie.com/sslpic/92470.7238d247f66.jpg"
border="0" class="logo" alt="MarketlyExampleAccount@marketly.com">
</div>
```

In another embodiment, if the payment service processor is determined to operate from the domain 'Wedopay.net', a merchant identifier may be determined from POST data sent during the automated browsing session, e.g., by locating a 'MerNo' parameter in the URL.

https://www.wedopay.net/p/form?MerNo=123456

In yet another embodiment, if the payment service processor is determined to operate from the domain 'secure-paymentsprocess.com', a merchant identifier may be determined from parameters of the URL identifying the payment-processing page, e.g., by locating a 'business' parameter in the POST data.

session_id=sdkfjwie8908sdfnln&business=my_site&description_payment=VISA

For another example, captured HTTP traffic may includes a merchant identifier in either URL parameters or within a POST body. For example, in a PayPal request, the linking URL often includes a reference to the entity which will receive payment, similar to the following URL fragment.

_otherInfo?business=merchant_account?otherInfo_

Consequently, when processing a PayPal domain, analyze-website routine 400 may process the captured http traffic using a regular expression or similar search pattern similar to the following, in which the matching "Value" group contains the merchant identifier.

/(?<Key>business)=(?<Value>[^&\s]+)/

In ending loop block 445, analyze-website routine 400 iterates back to opening loop block 410 to process the next payment option, if any. Once all payment options have been processed, analyze-website routine 400 ends in ending block 498.

Figure 5:
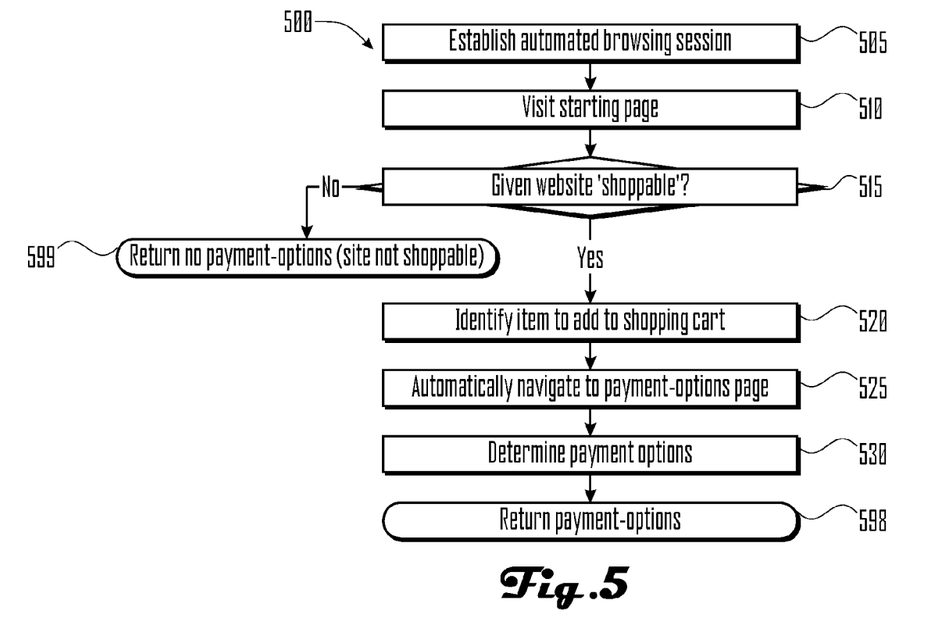
FIG. 5 illustrates a payment-option subroutine for automatically navigating a given website to locate and visit a payment-processing page, such as may be performed by a merchant-identifier server in accordance with one embodiment.

FIG. 5 illustrates a payment-option subroutine 500 for automatically navigating a given website to locate and visit a payment-processing page, such as may be performed by a merchant-identifier server 700 in accordance with one embodiment.

In block 505, payment-option subroutine 500 establishes an automated browsing session with the given website identified in block 305 in which communication traffic, page identifiers, and page contents are captured for analysis. As discussed above, in one embodiment, a software testing framework for web applications such as the Selenium testing framework (more particularly, the Selenium WebDriver component of the testing framework) may be employed to automatically control a browsing session in a supported browser. In other embodiments, other similar and/or related technologies may be employed to automate navigation through the given website.

In block 510, payment-option subroutine 500 visit starting page of the given website. Typically, payment-option subroutine 500 begins by visiting a 'home' or landing page of the given website. Once data associated with the landing page has been obtained, payment-option subroutine 500 may perform an initial screening to determine that the page data is at least a certain size and of a certain content type.

If the page data passes the initial screening, payment-option subroutine 500 may further obtain textual renderable data from the page and evaluate the textual contents to determine whether they match pre-determined characteristics of previously examined marketplace sites.

For example, in one embodiment, payment-option subroutine 500 may join inner-text HTML elements from the page source and into a collection of words and their respective frequencies. After applying a stop-word list, the word-frequencies may be measured against the known relative frequencies of words from previously categorized marketplaces to determine whether the current page is likely 'shoppable'.

In decision block 515, payment-option subroutine 500 determines whether the given website is 'shoppable'. If so, payment-option subroutine 500 proceeds to block 520; otherwise, payment-option subroutine 500 proceeds to ending block 599.

For example, in one embodiment, payment-option subroutine 500 may analyze various text elements on a page of the given website to determine whether the given website is likely a shoppable marketplace. To that end, various embodiments may parse and/or analyze various elements, characteristics, and/or metadata including those similar to some or all of the following.

Industry classification (to what general industry does this site pertain, e.g., software, electronics, branded goods, pharmaceuticals, automobile, general, and the like)

Relevance profiling (does the site pertain to the company and/or brands at issue?)

Payment method parsing

Shipping method parsing

IP WhoIs lookup

IP geo-location lookup

Domain Whois lookup

Domain stats lookup (e.g. Alexa Rank, Moz, PageRank, and the like)

IP WhoIs scoring (e.g., Does this WhoIs record contain information affiliated with previously identified fraudulent marketplaces?)

Domain WhoIs scoring (Does this WhoIs record contain information affiliated with previously identified fraudulent marketplaces?)

Redirection hack identification (If a redirection is detected, is it due to a hack on a legitimate website?)

Composite Scoring (Given all collected information, how likely is this site a fraudulent marketplace?)

If in decision block 515, payment-option subroutine 500 determines that the given website is likely not shoppable, payment-option subroutine 500 ends in ending block 599. Otherwise, in block 520, payment-option subroutine 500 identifies an item to add to a shopping cart of the given website. Generally, to identify an item to add to a shopping cart, payment-option subroutine 500 employs the same or similar techniques to those discussed in reference to block 520 (see FIG. 5, discussed above).

In block 525, payment-option subroutine 500 automatically navigates through the given website via said automated browsing session to locate and visit a payment-processing page. Generally, to automatically navigate the given website, payment-option subroutine 500 employs the same or similar techniques to those discussed in reference to block 430 (see FIG. 4, discussed above).

In block 530, payment-option subroutine 500 employs one or more regular expressions or similar search patterns to determine one or more payment options.

Payment-option subroutine 500 ends in ending block 598.

FIG. 6 illustrates an example report 600 associating merchant identifiers with e-commerce websites, such as may be provided to a brand owner or other interested party in accordance with one embodiment.

Figure 7:
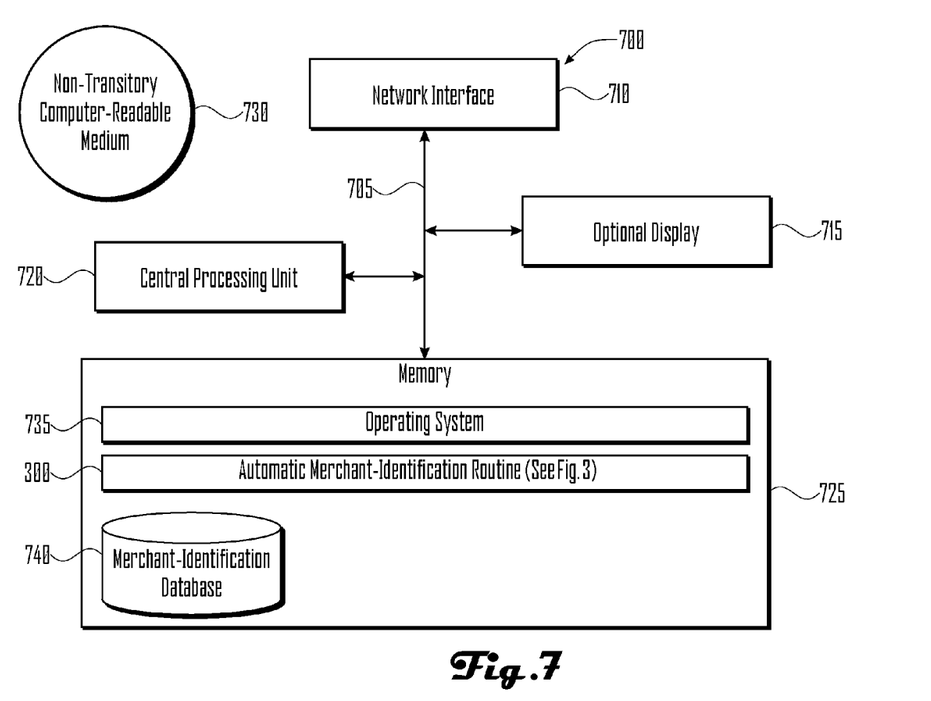
FIG. 7 illustrates several components of an exemplary merchant-identifier server in accordance with one embodiment.

FIG. 7 illustrates several components of an exemplary merchant-identifier server in accordance with one embodiment. In various embodiments, merchant-identifier server 700 may include a desktop PC, server, workstation, mobile phone, laptop, tablet, set-top box, appliance, or other computing device that is capable of performing operations such as those described herein. In some embodiments, merchant-identifier server 700 may include many more components than those shown in FIG. 7. However, it is not necessary that all of these generally conventional components be shown in order to disclose an illustrative embodiment.

In various embodiments, merchant-identifier server 700 may comprise one or more physical and/or logical devices that collectively provide the functionalities described herein. In some embodiments, merchant-identifier server 700 may comprise one or more replicated and/or distributed physical or logical devices.

In some embodiments, merchant-identifier server 700 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Merchant-identifier server 700 includes a bus 705 interconnecting several components including a network interface 710, an optional display 715, a central processing unit 720, and a memory 725.

Memory 725 generally comprises a random access memory ("RAM") and permanent non-transitory mass storage device, such as a hard disk drive or solid-state drive. Memory 725 stores program code for an automatic merchant-identification routine 300 for identifying merchants that operate e-commerce websites dealing in counterfeit or other prohibited goods (see FIG. 3, discussed above). In addition, the memory 725 also stores an operating system 735.

These and other software components may be loaded into memory 725 of merchant-identifier server 700 using a drive mechanism (not shown) associated with a non-transitory computer-readable medium 730, such as a floppy disc, tape, DVD/CD-ROM drive, memory card, or the like.

Memory 725 also includes merchant-identification database 740. In some embodiments, merchant-identifier server 700 may communicate with merchant-identification database 740 via network interface 710, a storage area network ("SAN"), a high-speed serial bus, and/or via the other suitable communication technology.

In some embodiments, merchant-identification database 740 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

The invention claimed is:

1. A computer-implemented method for identifying a merchant account associated with sales of prohibited goods, the method comprising:

identifying, by a computer, a website that has one or more traits that are characteristic of an e-commerce website that sells the prohibited goods;

establishing an automated browsing session between the computer and said website in which communication traffic, page identifiers, and page contents are captured for analysis;

automatically navigating, by the computer, through said website via said automated browsing session to locate and visit a payment-processing page;

determining, by the computer, which payment service processor of a plurality of known payment service processors is associated with said payment-processing page;

analyzing, by the computer, at least some of said captured communication traffic, page identifiers, and page contents to determine a merchant identifier identifying a particular merchant account established with said determined payment service processor for receiving proceeds from the sales of the prohibited goods; and storing, by the computer, a record associating said particular merchant account with said website.

2. The method of claim 1, wherein automatically navigating through said website to locate and visit said payment-processing page comprises:

automatically identifying an item that is available to purchase via said website;

automatically initiating a purchase-sequence of browsing operations that, if completed, would result in a purchase of the identified item; and automatically progressing through said purchase-sequence of browsing operations until encountering said payment-processing page.

3. The method of claim 2, wherein automatically identifying said item that is available to purchase via said website comprises:

obtaining an object model corresponding to a plurality of renderable elements on a given page of said website;

identifying a renderable-element whose contents match a price-tag-indicative pattern;

determining whether said renderable-element is a child of a parent container object having a shared structure that is shared by multiple other container objects within said object model; and when said parent container object is determined to have said shared structure, determining that said parent container object corresponds to said item that is available to purchase.

4. The method of claim 2, wherein automatically progressing through said purchase-sequence of browsing operations comprises:

determining that content associated with a given page matches a pattern indicating a product-detail page;

obtaining an object model corresponding to a plurality of renderable elements on said given page of said website;

identifying a price renderable-element whose contents match a price-tag-indicative pattern;

identifying a quantity renderable-element whose contents match a quantity-indicative pattern;

locating an add-to-cart button or an anchor element that is near to said price renderable-element and said quantity renderable-element within said object model; and activating said add-to-cart button or said anchor element.

5. The method of claim 2, wherein automatically progressing through said purchase-sequence of browsing operations comprises:

determining that content associated with a given page matches a pattern indicating a billing and/or shipping details page;

identifying every field and/or control on said given page that will accept input related to said billing and/or shipping details; and providing to said given page input values for said every field and/or control, said input values being randomly selected from a pool of pre-determined input options for a given type of field or control.

6. The method of claim 1, wherein the prohibited goods comprise counterfeit goods.

7. The method of claim 6, further comprising identifying said particular merchant account to an owner of a trademark associated with the prohibited goods.

8. A computing apparatus comprising a processor and a memory having stored thereon instructions that, when executed by the processor, configure the apparatus to:

identify, by the computing apparatus, a website that has one or more traits that are characteristic of an e-commerce website that sells the prohibited goods;

establish an automated browsing session between the computing apparatus and said website in which communication traffic, page identifiers, and page contents are captured for analysis;

automatically navigate, by the computing apparatus, through said website via said automated browsing session to locate and visit a payment-processing page;

determine, by the computing apparatus, which payment service processor of a plurality of known payment service processors is associated with said payment-processing page;

analyze, by the computing apparatus, at least some of said captured communication traffic, page identifiers, and page contents to determine a merchant identifier identifying a particular merchant account established with said determined payment service processor for receiving proceeds from the sales of the prohibited goods; and store, by the computing apparatus, a record associating said particular merchant account with said website.

9. A non-transitory computer-readable storage medium having stored thereon instructions including instructions that, when executed by a processor of a computer, configure the processor to:

identify, by the computer, a website that has one or more traits that are characteristic of an e-commerce website that sells the prohibited goods;

establish an automated browsing session between the computer and said website in which communication traffic, page identifiers, and page contents are captured for analysis;

automatically navigate, by the computer, through said website via said automated browsing session to locate and visit a payment-processing page;

determine, by the computer, which payment service processor of a plurality of known payment service processors is associated with said payment-processing page;

analyze, by the computer, at least some of said captured communication traffic, page identifiers, and page contents to determine a merchant identifier identifying a particular merchant account established with said determined payment service processor for receiving proceeds from the sales of the prohibited goods; and store, by the computer, a record associating said particular merchant account with said website.

10. A computer-implemented method for identifying a cluster of related websites that sell prohibited goods, the method comprising:

identifying, by a computer, a plurality of websites that have one or more traits that are characteristic of an e-commerce website that sells prohibited goods;

establishing, by the computer, a plurality of automated browsing sessions between the computer and a respective plurality of websites in which communication traffic, page identifiers, and page contents from each automated browsing session are captured for analysis;

during each of said plurality of automated browsing sessions, automatically navigating, by the computer, through one of said plurality of websites to locate and visit a payment processing page;

analyzing, by the computer, said captured communication traffic, page identifiers, and page contents from each of said plurality of automated browsing sessions to identify at least one common merchant identifier and/or page identifier that was encountered in two or more of said plurality of automated browsing sessions; and identifying, by the computer, based at least in part on said at least one common merchant identifier and/or page identifier, a plurality of related websites among said plurality of websites that are likely associated with a common merchant that deals in the prohibited goods.

11. The method of claim 10, wherein identifying said plurality of related websites comprises, for each automated browsing session of said plurality of automated browsing sessions:

determining which payment service processor of a plurality of known payment service processors is associated with said payment-processing page; and analyzing at least some of said captured communication traffic, page identifiers, and page contents to determine a merchant identifier identifying a particular merchant account established with said determined payment service processor for receiving proceeds from sales of the prohibited goods.

12. The method of claim 10, wherein identifying said plurality of related websites comprises, for each automated browsing session of said plurality of automated browsing sessions:

determining a resource identifier identifying an intermediate resource to which a given automated browsing session is directed or redirected before visiting said payment-processing page.

13. The method of claim 10, wherein the prohibited goods comprise counterfeit goods.

14. The method of claim 13, further comprising identifying said plurality of related websites to an owner of a trademark associated with the prohibited goods.

15. A computing apparatus comprising a processor and a memory having stored thereon instructions that, when executed by the processor, configure the apparatus to:

identify, by the computing apparatus, a plurality of websites that have one or more traits that are characteristic of an e-commerce website that sells prohibited goods;

establish, by the computing apparatus, a plurality of automated browsing sessions between the computing apparatus and a respective plurality of websites in which communication traffic, page identifiers, and page contents from each automated browsing session are captured for analysis;

during each of said plurality of automated browsing sessions, automatically navigate, by the computing apparatus, through one of said plurality of websites to locate and visit a payment processing page;

analyze, by the computing apparatus, said captured communication traffic, page identifiers, and page contents from each of said plurality of automated browsing sessions to identify at least one common merchant identifier and/or page identifier that was encountered in two or more of said plurality of automated browsing sessions; and identify, by the computing apparatus, based at least in part on said at least one common merchant identifier and/or page identifier, a plurality of related websites among said plurality of websites that are likely associated with a common merchant that deals in the prohibited goods.

16. A non-transitory computer-readable storage medium having stored thereon instructions including instructions that, when executed by a processor of a computer, configure the processor to:

identify, by the computer, a plurality of websites that have one or more traits that are characteristic of an e-commerce website that sells prohibited goods;

establish, by the computer, a plurality of automated browsing sessions between the computer and a respective plurality of websites in which communication traffic, page identifiers, and page contents from each automated browsing session are captured for analysis;

during each of said plurality of automated browsing sessions, automatically navigate, by the computer, through one of said plurality of websites to locate and visit a payment processing page;

analyze, by the computer, said captured communication traffic, page identifiers, and page contents from each of said plurality of automated browsing sessions to identify at least one common merchant identifier and/or page identifier that was encountered in two or more of said plurality of automated browsing sessions; and identify, by the computer, based at least in part on said at least one common merchant identifier and/or page identifier, a plurality of related websites among said plurality of websites that are likely associated with a common merchant that deals in the prohibited goods.

* * * * *